US010151595B2

(12) United States Patent
Huber (10) Patent No.: US 10,151,595 B2
(45) Date of Patent: Dec. 11, 2018

(54) PREDICTING FUEL CONSUMPTION AND TIME OF ARRIVAL FOR A VEHICLE NAVIGATION SYSTEM

(71) Applicant: Continental Automotive GmbH, Hannover (DE)

(72) Inventor: Tobias Huber, Sinzing (DE)

(73) Assignee: CONTINENTAL AUTOMOTIVE GMBH, Hanover (DE)

(*) Notice: Subject to any disclaimer, the term of this patent is extended or adjusted under 35 U.S.C. 154(b) by 108 days.

(21) Appl. No.: 15/309,871

(22) PCT Filed: May 8, 2015

(86) PCT No.: PCT/EP2015/060148
§ 371 (c)(1),
(2) Date: Nov. 9, 2016

(87) PCT Pub. No.: WO2015/169938
PCT Pub. Date: Nov. 12, 2015

(65) Prior Publication Data
US 2017/0146356 A1 May 25, 2017

(30) Foreign Application Priority Data

May 9, 2014 (DE) .................. 10 2014 208 757

(51) Int. Cl.
| G01C 21/10 | (2006.01) |
| G01C 21/20 | (2006.01) |
| G01C 21/34 | (2006.01) |
| G01C 21/36 | (2006.01) |
| G01F 9/00 | (2006.01) |
| G07C 5/00 | (2006.01) |
| G07C 5/08 | (2006.01) |

(52) U.S. Cl.
CPC ......... *G01C 21/3469* (2013.01); *G01C 21/10* (2013.01); *G01C 21/20* (2013.01);
(Continued)

(58) Field of Classification Search
CPC .... G01C 21/3469; G01C 21/20; G01C 21/10; G01C 21/3697; G07C 5/0825; G07C 5/0808; G07C 5/008; G01F 9/001
See application file for complete search history.

(56) References Cited

U.S. PATENT DOCUMENTS 5,913,917 A * 6/1999 Murphy .............. B60R 16/0232
701/123
2004/0093264 A1* 5/2004 Shimizu ................. G07C 5/008
705/13
(Continued)

FOREIGN PATENT DOCUMENTS

| DE | 102009006249 A1 | 9/2009 | ............. G01C 21/34 |
| DE | 102009054002 A1 | 7/2010 | ............. G01C 21/04 |
(Continued)

OTHER PUBLICATIONS

Machine Translation of DE 10 2009 039092 (Year: 2009).*
(Continued)

*Primary Examiner* — Alan D Hutchinson
(74) *Attorney, Agent, or Firm* — Slayden Grubert Beard PLLC (57) ABSTRACT

The present disclosure is related to vehicle navigation systems. The teachings may be embodied in methods for predicting fuel consumption and time of arrival, including: recording a destination user input; calculating a distance to the destination from a current location of the vehicle; recording a driving speed profile for the destination user input or for a route to the destination, as calculated by the vehicle navigation apparatus; storing the driving speed profile together with a driver feature; recording a user input comprising a desired speed, time of arrival, or fuel consumption trend; recording a second destination user input; and calculating the fuel consumption and the time of arrival for the new destination user input on the basis of a route to the further destination, as calculated by the vehicle navigation apparatus, and a consumption value representing fuel
(Continued)

consumption of the stored driving speed profile applied to the route.

17 Claims, 3 Drawing Sheets

(52) U.S. Cl.
CPC ......... *G01C 21/3697* (2013.01); *G01F 9/001* (2013.01); *G07C 5/008* (2013.01); *G07C 5/0808* (2013.01); *G07C 5/0825* (2013.01)

(56) References Cited

U.S. PATENT DOCUMENTS

| | | | | |
|---|---|---|---|---|
| 2011/0196817 A1* | 8/2011 | Pryakhin | ................ | G01C 21/26 706/14 |
| 2011/0307165 A1 | 12/2011 | Hiestermann et al. | ....... | 701/119 |
| 2012/0078496 A1* | 3/2012 | Lindhuber | ............. | B60K 35/00 701/123 |
| 2014/0324328 A1* | 10/2014 | Granato | ................ | B60W 10/08 701/123 |
| 2016/0123755 A1* | 5/2016 | Gambera | .......... | B60W 50/0097 701/70 |

FOREIGN PATENT DOCUMENTS

| | | | | |
|---|---|---|---|---|
| EP | 2028057 A2 | 2/2009 | ........... | B60R 16/023 |
| WO | 2015/169938 A1 | 11/2015 | ............. | G01C 21/34 |

OTHER PUBLICATIONS

German Office Action, Application No. 102014208757.0, 7 pages, dated Jan. 8, 2015.

International Search Report and Written Opinion, Application No. PCT/EP2015/060148, 21 pages, dated Aug. 28, 2015.

* cited by examiner

PREDICTING FUEL CONSUMPTION AND TIME OF ARRIVAL FOR A VEHICLE NAVIGATION SYSTEM

CROSS-REFERENCE TO RELATED APPLICATIONS

This application is a U.S. National Stage Application of International Application No. PCT/EP2015/060148 filed May 8, 2015, which designates the United States of America, and claims priority to DE Application No. 10 2014 208 757.0 filed May 9, 2014, the contents of which are hereby incorporated by reference in their entirety.

TECHNICAL FIELD

The present disclosure is related to vehicle navigation systems. The teachings may be embodied in methods for predicting fuel consumption and time of arrival.

BACKGROUND

It is known to use a navigation apparatus of a vehicle to display not only a route to the destination but also an estimated time of arrival. It is also known that an earlier time of arrival cannot be reconciled with a low fuel consumption, in which case there is an exchange relationship between these two variables since a low fuel consumption is to the detriment of an early time of arrival and an early time of arrival is associated with an increased fuel consumption related to the resulting accelerations associated therewith. It is recognized that the fuel consumption and the complementary variable of the time of arrival (or the driving time linked thereto) depend not only on the driving style and the loads which are switched on in the vehicle, but also on the traffic and road conditions, with the result that the variables of the fuel consumption and time of arrival can be recorded only with restricted precision using methods which do not take this into account.

SUMMARY

Teachings of the present disclosure can be used to predict the fuel consumption and time of arrival in a more precise manner and can be used, in particular, to produce suggestions for the driver which can be used to reach a desired point of the exchange relationship between the fuel consumption and the time of arrival with sufficient precision. Various embodiments may include methods for predicting a fuel consumption (3a) and the time of arrival (2a) for a vehicle navigation apparatus, having the steps of: recording a destination user input and calculating the distance to the destination by means of the vehicle navigation apparatus; recording a driving speed profile for the destination user input (6) or for a route before the destination is reached, as calculated by the vehicle navigation apparatus, and storing the driving speed profile together with a driver feature; recording a user input (12-16; 22, 28; 34, 36) of a desired speed, time of arrival or consumption trend; recording a further destination user input (6); and calculating the fuel consumption and the time of arrival for the new destination user input on the basis of a distance before the further destination is reached, as calculated by the vehicle navigation apparatus, and a consumption value representing the consumption of the stored driving speed profile.

In some embodiments, the driving speed profile is transmitted to a mobile radio terminal, to a stationary computer, or to a central computer and being stored there.

In some embodiments, the driving speed profile being transmitted to the mobile radio terminal or to the computer and being stored there together with driving speed profiles of further drivers of the same vehicle or of a group of drivers, or the driving speed profile being transmitted to the central computer and being stored there together with driving speed profiles of further drivers, the driving speed profiles relating to the same route.

In some embodiments, the fuel consumption (3a) and the time of arrival (2a) may be calculated in a mobile radio terminal, in a stationary computer, or in a central computer.

In some embodiments, environmental information (100-130, 150) relating to the destination or to the route being determined and the fuel consumption and the time of arrival being calculated on the basis of the environmental information, the environmental information being, in particular, traffic or road condition or weather information from a traffic or weather service (100), traffic or road condition information transmitted by vehicles by means of car-to-X communication (120), or geographical properties (110) of the route such as gradient or bend radii.

In some embodiments, an efficiency request user input representing a desired trend to reduce consumption or shorten the driving time in a plurality of stages being recorded, and the consumption value being changed according to the efficiency request user input, the changed consumption value being used as a basis for calculating the fuel consumption and the time of arrival.

In some embodiments, an efficiency request selection containing a plurality of fuel consumption values and/or times of arrival being output graphically and/or as text on a user interface, the plurality of fuel consumption values and/or times of arrival being calculated according to different speed or consumption trends, and a selected fuel consumption value and/or time of arrival being recorded by means of the user interface.

Some embodiments may include displaying a user output representing the calculated fuel consumption and the calculated time of arrival, in particular together with a difference between current accelerations or speeds of the vehicle and accelerations or speeds which would result in the calculated fuel consumption and the calculated time of arrival, preferably taking into account environmental information relating to the route to the destination; and, in particular, creating a graphical user output having a scale (300, 400), which represents a range of consumption values, and a mark (310, 410) inside the scale (300, 400) which corresponds to the calculated fuel consumption.

Some embodiments may include the fuel consumption being repeatedly updated and the mark representing the updated fuel consumption.

Some embodiments may include a mark inside the scale, which represents the minimum achievable consumption which can be used to achieve the time of arrival, also being displayed, environmental information which comprises traffic or road condition or weather information for the calculated route being taken into account when calculating the minimum achievable consumption, and/or vehicle parameters which influence the consumption, for instance a mass of the vehicle, a loading condition, a drag coefficient or a tire type, being taken into account when calculating the minimum achievable consumption.

Some embodiments may include specific speed, acceleration and braking specifications, the compliance with which would result in the calculated fuel consumption and in the calculated time of arrival, on respective route sections being displayed as a user output on a user interface, the specifications preferably being displayed in a comparative manner with recorded speed, acceleration and braking specifications, which are received via a user input interface, or their difference being displayed.

DETAILED DESCRIPTION

Teachings of the present disclosure may be implemented to calculate the fuel consumption and the time of arrival for a current destination user input on the basis of the distance before the further destination is reached, in which case use is also made of a consumption value which represents the consumption of a stored driving speed profile. The stored driving speed profile represents the driving speed profile of the driver or the vehicle for past journeys which correspond, in particular, at least partially to the current route resulting from the destination user input.

Furthermore, properties of the route ahead which affect the consumption, for instance gradients, bend radii, speed limits, current traffic, road condition or weather information (relating to the route ahead), and the like, are concomitantly included. In order to take into account the way of driving planned by the driver, a user input of a desired speed, time of arrival, or consumption trend, which represents whether the driver's preference is more for a short journey time or a short route duration or whether the driver's preference is for a fuel-efficient way of driving, is recorded.

The driver's preference for a fuel-efficient way of driving can also be input by extending the (permissible) driving time or by delaying the time of arrival. The user input represents the exchange relationship mentioned at the outset. Since the consumption value is oriented not only to the route and a standard fuel consumption of the vehicle but can also take into account the geographical and current route conditions (gradient, bend radius, current traffic, current road condition, and/or current weather), the result is a precise prediction of the fuel consumption and the time of arrival (and therefore also a more precise statement and possibility of complying with the exchange relationship mentioned).

In addition, a user output representing the calculated fuel consumption and the time of arrival can be displayed, in particular together with a deviation from the current driving behavior in order to therefore make it possible for the driver to react to a deviation from the planned time of arrival or the planned fuel consumption (or its trend) by means of an appropriate driving behavior and to reduce the deviation by suitably selecting the speed and the acceleration. This display of the user output likewise makes it possible for the driver to vary a deviation from the calculated or planned time of arrival or fuel consumption, in which case the user is informed of this deviation and can therefore deviate from the desired fuel consumption or the desired time of arrival even during the journey.

These teachings may be embodied in methods for predicting a fuel consumption and the time of arrival for a vehicle navigation apparatus. The teachings provide for a destination user input to be recorded and for the distance to the destination to be calculated using the vehicle navigation apparatus. In this case, the vehicle navigation apparatus can resort to stored routes in a known manner and can calculate a suitable route from the destination and a current position of the vehicle using known methods.

A driving speed profile for the destination user input is also recorded, for instance to determine reference data for the driving speed profile for future comparable routes. Alternatively, instead of the destination user input, the route before the destination is reached is taken as a basis, with the result that a driving speed profile (for generating preference data) for the route before the destination is reached, which is calculated by the vehicle navigation apparatus, is recorded. This speed profile is stored together with a driver feature. A driver identification or an indicator which specifies the driving behavior in different categories, for example "slow driver", "driver with average speed", and "sporty driver" whose maximum speeds and maximum accelerations are above those of the previously mentioned driver types, can be used as the driver feature.

The driving speed profile may be stored in an encrypted or password-protected manner, either in the vehicle itself or outside the vehicle, for example in individual mobile devices which can be carried along with the vehicle, or in a central computer. In the case of apparatuses outside the vehicle in particular, the data are transmitted to said devices in encrypted form. The recording of the driving speed profile is used to generate reference data which are used when subsequently calculating the fuel consumption and/or the time of arrival.

A user input representing a desired speed, time of arrival and/or consumption trend is recorded for a current route, for example as part of a further destination user input. As a result, the driver can input the desired preference with regard to the low fuel consumption (or else later time of arrival), on the one hand, or with regard to an earlier time of arrival, on the other hand, for the current route to be traveled.

A further destination user input is also recorded by means of the vehicle navigation apparatus, for instance to calculate the future route and to be able to take this route into account when calculating the fuel consumption and the time of arrival for the current route.

Finally, the fuel consumption and the time of arrival for the new destination user input (and therefore for the current route ahead) are calculated. These values are calculated on the basis of the distance determined by the vehicle navigation apparatus. The distance relates to the route before the further destination is reached, that is to say also to the route ahead or to the route between the current position of the vehicle and the (current) further destination. In order to calculate the fuel consumption, a consumption value representing the consumption of the stored driving speed profile is also calculated. The consumption value is therefore based on the above-mentioned reference data which have resulted from previous journeys.

For this purpose, a stored driving speed profile may be used but also a driving speed profile resulting from a combination of a plurality of stored driving speed profiles which relate, at least in sections, to the same route as the current route. Stored driving speed profiles can be combined, for instance by means of averaging, by means of interpolation or by determining a median. In this case, outliers, for instance, can be removed from the combination, outliers being recognized from the fact that they have a deviation from the stored driving speed profiles which is greater than a particular predefined threshold value.

The driving speed profile can be transmitted to a mobile radio terminal, to a stationary computer or to a central computer. In particular, the driving speed profile is stored there. It is also possible to transmit and store a plurality of speed profiles or averaged or generally combined speed profiles. As already noted, the transmission and the storage are preferably encrypted, e.g., password-protected, especially since the driving speed profile is transmitted and stored together with a driver identity. Instead of a driver identity, it is also possible to use a vehicle identity or else an indicator representing the driver type. The mobile radio terminal may generally be an electronic device which is carried along in the vehicle, for instance a smartphone. The stationary computer may be, for example, the computer belonging to the driver, for instance a laptop which can have a data connection to the vehicle.

The driving speed profile may be transmitted to the mobile radio terminal or to the computer in order to be stored there together with driving speed profiles of further drivers of the same vehicle and/or of a group of drivers. If a plurality of drivers share a vehicle, the associated driving speed profiles can be stored together or the driving speed profiles can be combined. In this case, a distinction can be made between different drivers of the same vehicle or it is possible to extrapolate from one driver of the vehicle to the driving speed profile of another driver of the vehicle. For the purpose of the extrapolation, relationships between driving speed profiles of one driver and driving speed profiles of the other driver are formed in order to be able to take into account different driving behaviors which are specific to the drivers.

Alternatively or in combination with this, the driving speed profile can be transmitted to the central computer (and stored there). The driving speed profile can also be stored together with driving speed profiles of further drivers, the driving speed profiles relating, at least in sections, to the same route. As a result, conclusions with respect to the driving speed profile of another vehicle can be drawn from the driving behavior or from the driving speed profiles of further drivers, in which case an extrapolation as mentioned above can also be used here. Since the central computer has numerous driving speed profiles, said computer can use a broad database for the same route or for the same route section in order to calculate the fuel consumption and the time of arrival for the current route.

In such embodiments, it is also possible to take into account different times of the day, different traffic or route conditions or the information indicating that the current journey or the stored driving speed profiles relate(s) to a working day or to a non-working day. In this case too, it is possible to use a relationship or an extrapolation, for instance the relationship or the deviation of driving profiles on working days in comparison with driving profiles on non-working days, to also take this information into account. Instead of or in combination with the information relating to whether a working day is involved, it is also possible to use the current traffic situation, road situation or weather situation in order to infer a different weather situation, traffic situation, or road situation from driving profiles for a particular weather situation, road situation, or traffic situation, in particular on the basis of a previously determined relationship between the relevant driving speed profiles.

In addition, the fuel consumption and the time of arrival can also be calculated in a mobile radio terminal, in a stationary computer, or in a central computer in order to transmit these data to the vehicle navigation apparatus. Alternatively, the vehicle navigation apparatus itself can calculate the fuel consumption and the time of arrival. Environmental information can be determined for the destination and/or the route. In this case, the fuel consumption and the time of arrival may be calculated on the basis of the environmental information. The environmental information provides information relating to the geographical or current route condition, the general traffic situation or the specific traffic situation on the route and/or the weather situation and relates to general information which concerns the destination or the route and also influences the fuel consumption and the time of arrival.

The environmental information may include traffic or road condition or weather information. This information can be received from a traffic or weather service. The environmental information may also be traffic or road condition information which is transmitted by vehicles, either to a central location and from there to the vehicle, or is directly transmitted from other vehicles to the present vehicle. This information may relate to traffic and road condition information from vehicles which are between the present vehicle and the destination or are on the route ahead. For instance, sensor data from driver assistance systems of vehicles driving ahead, for instance distance information as well as the speed, acceleration or braking activities, and also operating parameters of driver assistance systems (which represent an automatic braking intervention, for instance) or of safety systems such as anti-lock braking systems or traction control systems, can be used as traffic or road condition information. In particular, the coefficient of friction of an anti-lock braking system or of a traction control system of a vehicle in front can be transmitted and can be received by the vehicle whose fuel consumption and time of arrival are predicted.

Furthermore, the environmental information may comprise geographical properties of the route, for instance the gradient or the bend radii. For example, in the case of high volumes of traffic, in the case of roadworks ahead, in the case of heavy precipitation or in the case of speed limits (which may be variable) recorded by vehicles driving in front, a reduced speed is assumed and/or it is assumed that start/stop information which entails a high fuel consumption based on the route possibly arises. In particular, not only the future driving behavior but also roughly the power of secondary loads can be estimated from the weather information, for instance if, in the case of heavy precipitation on the route ahead, it will be necessary to operate the vehicle heating at high power in order to avoid misted windows. These loads which do not directly concern the traction of the vehicle can also have an impact on the consumption and may be taken into account by the methods taught herein. It can also be taken into account that, in the case of gradients (negative or positive), recuperation energy is fed in and can likewise have an impact on the fuel consumption.

Furthermore, an efficiency request user input revealing a desired trend to reduce consumption or shorten the journey time in a plurality of stages, for instance, can be recorded. This trend is also described herein as a preference with regard to a low fuel consumption or an early time of arrival and represents, in particular, the exchange relationship between the time of arrival and the fuel consumption. The consumption value is changed according to the efficiency request user input. The changed consumption value is taken as a basis for calculating the fuel consumption and the time of arrival. The desired speed/time of arrival or consumption trend can therefore be input during the journey by means of the efficiency request user input. The efficiency request user input corresponds, in particular, to the recording of a user input of a desired speed/time of arrival or consumption trend, the efficiency request user input being able to be a repeated and therefore updating input.

An efficiency request selection containing a plurality of fuel values and/or a plurality of times of arrival can be output graphically and/or as text, in particular optically, on a user interface. The plurality of fuel consumption values and/or times of arrival are calculated according to different speed or time of arrival or consumption trends. A selected fuel consumption value and/or a desired time of arrival and/or a desired speed is/are also recorded by means of the user interface, change inputs for a fuel consumption value and/or for a desired time of arrival also being able to be recorded by means of the interface. It is noted that the speed trend is directly linked to the time of arrival trend to the effect that a trend for the earlier time of arrival is directly linked to a trend for the higher speed or for the higher acceleration.

The optical display can be replaced with an acoustic representation or can be combined with the latter. A user interface in the form of a touch-sensitive screen is preferably used, the screen being used to output or display the plurality of fuel consumption values and/or times of arrival, and the touch-sensitive property being used to record the selected fuel consumption and/or the selected time of arrival.

Some embodiments may include a user output representing the calculated fuel consumption and the calculated time of arrival to be displayed. These data are displayed, in particular, together with a difference between current accelerations, speeds, and/or current consumption values of the vehicle and the relevant variables (accelerations, speeds, or fuel consumption values) which would result in the calculated fuel consumption and the calculated time of arrival. In this case, the deviation which would result from the current driving behavior and the calculated fuel consumption or the calculated time of arrival is displayed. Instead, it is also possible to display the difference between the current acceleration, the current speed, and the current fuel consumption, on the one hand, and an input fuel consumption or the input time of arrival.

Environmental information relating to the route to the destination or the destination itself may be taken into account, in particular when displaying the deviation from the calculated fuel consumption and the calculated time of arrival. The environmental information corresponds to the environmental information described above.

In particular, a graphical user output having a scale, which represents a range of consumption values, is created. The user output also comprises a mark (inside the scale) which corresponds to the calculated (or current) fuel consumption. As a result, the driver can readily appreciate the relationship of the calculated fuel consumption with respect to the range of consumption values and, as a result, can readily appreciate the deviation.

The fuel consumption is repeatedly updated, in particular taking into account environmental information which is likewise preferably updated, the mark representing the updated fuel consumption, in particular.

A mark inside the scale, which represents the minimum achievable consumption which can be used to achieve the time of arrival, can be displayed. Environmental information, in particular the environmental information described above, is taken into account when calculating the minimum achievable consumption. The environmental information comprises the traffic or road condition or weather information for calculating the route or for the destination. Alternatively or in combination with this, vehicle parameters which influence the consumption can be taken into account when calculating the minimum achievable consumption. Such vehicle parameters are, for instance, the mass of the vehicle, the loading condition, the drag coefficient (which in turn depends, for instance, on the luggage on the vehicle roof), or the tire type.

Speed, acceleration and braking specifications, the compliance with which would result in the calculated fuel consumption or in the calculated time of arrival, on the respective route sections can be displayed as a user output. In particular, this user output can be displayed on the user interface. The specifications are preferably displayed in a comparative manner with recorded speed, acceleration and braking specifications or else with recorded consumption specifications, which are received via a user input interface. Alternatively or in combination with this, the difference between the specifications and the (actual) recorded speed, acceleration, braking and consumption specifications can be displayed. In this case too, the user interface may be a touch-sensitive screen which is used for the user output and is also used to receive user inputs (that is to say speed, acceleration, and braking specifications or else consumption specifications).

Figure 1:
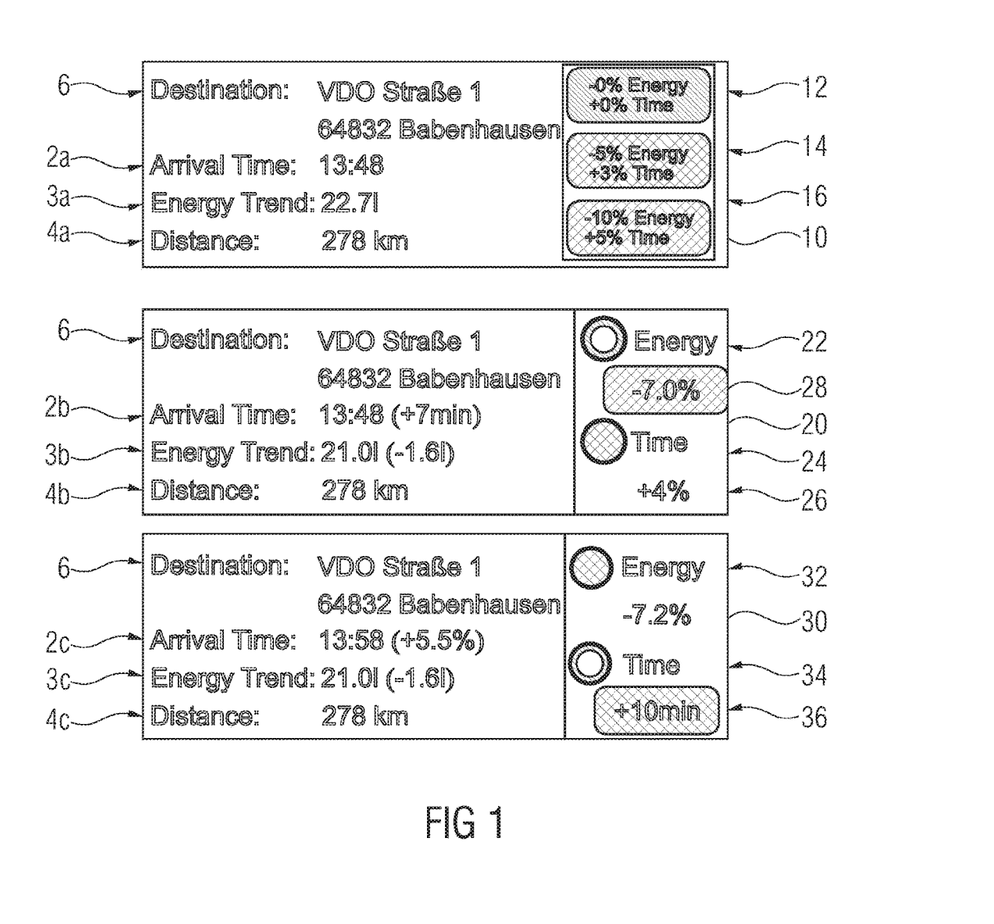
FIG. 1 shows a display in different display modes, according to the teachings of the present disclosure.

The display in the display mode 10 in FIG. 1 comprises a first field 2*a* for displaying the time of arrival, a second field 3*a* for displaying the fuel consumption, and a third field 4*a* for displaying the distance to the destination. The destination is displayed in a destination field 6. The time of arrival 2*a* and the consumption 3*a* were calculated according to the distance 4*a* and on the basis of a consumption value.

The display in the display mode 10 also comprises three fields 12, 14, and 16 for selecting an efficiency request user input. In this case, the field 12 relates to a selection, during which the fuel consumption and the time of arrival as previously calculated are selected; the selection possibility in the field 14 relates to a reduction in the fuel consumption by 5% in comparison with the previously calculated fuel consumption and, at the same time, indicates the linked delay in the time of arrival by 3% (based on the likely driving time). The third selection possibility in the field 16 provides a stronger accentuation of the preference for "reduced fuel consumption" than the selection possibilities in the fields 12 and 14 and proposes a reduction in the fuel consumption by 10% in comparison with the previously calculated fuel consumption. This is associated with an extension of the driving time by 5%. The selection possibility in the field 12 is selected in the display 10.

If the selection possibilities in the fields 14 and 16 are selected, the time of arrival is accordingly adapted (that is to say delayed) and the fuel consumption is reduced according to the selection.

The reference symbols 20 and 30 relate to a further display mode in which, like in the display mode 10, the time of arrival 2*b*, 2*c*, the fuel consumption 3*b*, 3*c*, and the distance to the destination 4*b*, 4*c* are displayed. The selection buttons in the fields 22 and or the fields 32 and 34 can be used to select whether the desired fuel consumption (display mode 20) or the desired time of arrival (display mode 30) is intended to be displayed and changed. In the display mode 20, the (variable) indication of the fuel consumption is selected, in particular as a percentage in the form of the field 28 which represents a reduction in the fuel consumption by 7% in comparison with the previously indicated fuel consumption. This value can be changed using selection buttons or operating fields (not illustrated).

In the display mode 20, the resulting extension of the journey time or delay in the time of arrival is also displayed in the form of the field 26, with the result that the time of arrival is delayed by 4% (based on the driving time) according to the selected reduced fuel consumption in the field 28. The delay in the time of arrival resulting from the field 28 is likewise displayed in the field 2b as an additional time which must be added to the previously planned time of arrival. In the same manner, the reduction in the fuel consumption, see field 28, is also displayed in the fuel consumption in the field 3b in which the absolute fuel consumption and the reduction resulting from the selection of the (operating) field 28 are displayed.

The display mode 30 relates to the same type of display as the display mode 20, but the time has been selected as the variable to be input in the display mode 30. As a result, the selection field 34 is pressed (that is to say selected). The field 36 makes it possible to set the desired delay in the time of arrival. The resulting reduction in the fuel consumption is displayed as a percentage below the selection field 32 which is deactivated in the display mode 30. The display mode 30 also indicates, with the entry in the field 2c, the time of arrival together with the percentage increase in the driving time resulting from the selection. The fuel consumption in the field 3c is also displayed in absolute values, together with a relative value corresponding to the changed consumption in the field 32 which again results from the selected changed time in the fields 34, 36.

Figure 2:
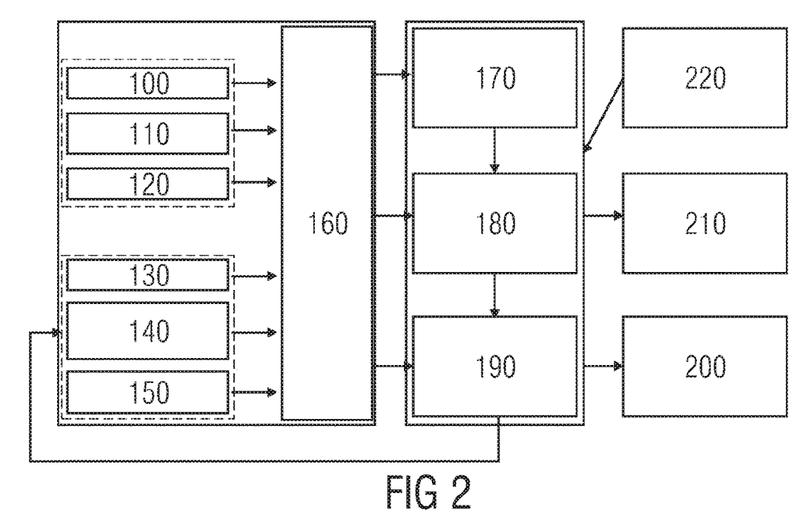
FIG. 2 shows an outline circuit diagram suitable for illustrating the method, according to the teachings of the present disclosure.

FIG. 2 schematically shows a data flow which is suitable for executing the method described here. A central computer 100 keeps cloud services available, a position and navigation route source 110 (for example the navigation device) and a receiving location 120 for receiving data from other vehicles, in particular by car-to-X communication, are illustrated as data sources.

Further data sources are internal sensors 130, and current user input data relating to the traction of the vehicle, for instance accelerator pedal and brake pedal activities, in which case the reference symbol 140 can furthermore also be used for stored driving speed profiles. The data source 150 is used to represent parameters of the vehicle which can be stored, in particular, or can be recorded using force sensors, such as mass, loading condition, drag coefficient or rolling resistance (which can also be represented as the tire type). These data are forwarded together in an interface unit 160 to a calculation unit 170 for calculating the route, to a unit 180 for predictively calculating the fuel consumption and/or time of arrival (or the driving time), and to a unit 190 for determining the current fuel consumption or for determining the total amount of energy before the destination is reached. It is also clear that the calculation unit 170 for calculating the route forwards at least the distance, but also routes or environmental information relevant to the fuel consumption, to the unit 180. The latter can use these data and the data received from the data sources 100 to 150 to calculate the likely fuel consumption and the likely time of arrival.

The unit 190 displays the likely fuel consumption and the likely time of arrival according to the determined data. The driver can orient himself on the basis of these data, which are optically displayed using a unit 200 (or display), and can therefore adjust his driving behavior. This effect of the displayed data on the driver is illustrated by the arrow between the unit 190 and the data source 140, the data source 140 representing the driving behavior (current or past).

The likely fuel consumption from the unit 180 for predictive calculation can also be output using an output 210. The output 210 may be optical and may be formed, together with the unit 200, as a common display.

Finally, there is a user input interface 220 which can be used to input an efficiency request user input (that is to say a desired change in the fuel consumption or the time of arrival), as illustrated in FIG. 1. The units 200 to 220 are preferably a common user interface set up to output and receive data, in particular in the form of a touch-sensitive screen on which an efficiency request user input can be captured or on which the calculated time of arrival or the calculated fuel consumption can be indicated. Instead of a touch-sensitive screen, it is also possible to use a screen having an input interface, for example in the form of pushbuttons or switches. The units 200 and 210 may also comprise sound generators, in particular set up for a voice output. Instead of an optical or graphical output, the units may also be designed for an acoustic and/or haptic output. The haptic output can affect the steering wheel or a pedal of the vehicle.

Figure 3:
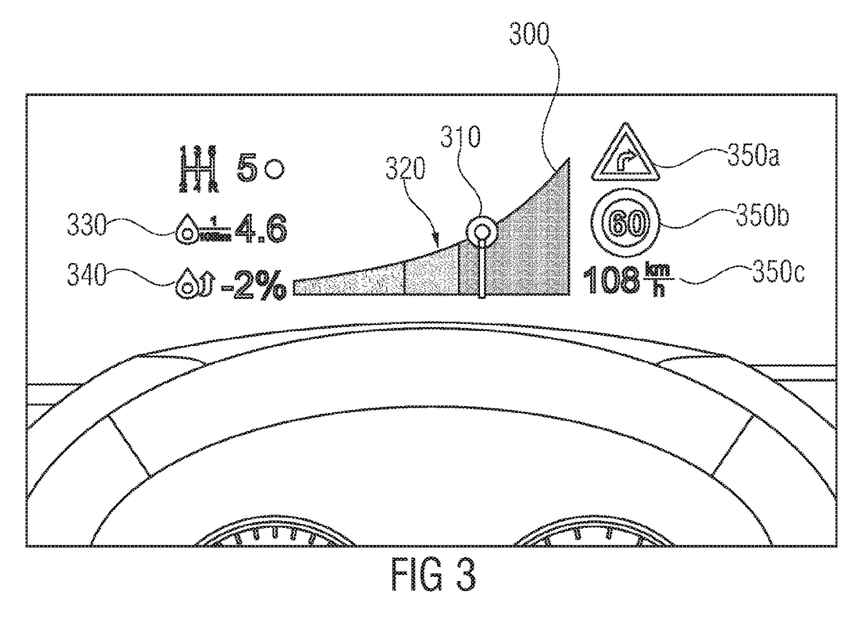
FIG. 3 shows a user output in the form of a scale together with further information, according to the teachings of the present disclosure.

FIG. 3 shows an example embodiment of a display, in which case different fuel consumption values (in a continuous manner as a graph) are displayed in the form of a scale or in the form of a characteristic curve. A mark 310 which represents the current fuel consumption is displayed on this scale. It can be seen from FIG. 3 that a desired region in which the mark 310 should be situated is highlighted or marked on the scale, the desired region 320 resulting from the recorded speed/time of arrival or consumption trend. The current consumption 330 and a change in consumption 340 are also displayed. Alternatively, the reference symbol 340 may represent a difference between the current fuel consumption and an input, desired fuel consumption.

Detected traffic signs 350a, 350b are also displayed. The detected traffic signs may also be used as environmental information, in particular, the speed limit 350b and the bend 350a revealing that the consumption will be low on the next route section since a low speed can be expected. In this case, the current speed 350c can be used, for example. If this speed is above the speed limit 350b (including a safety margin), in particular, it can be assumed that the fuel consumption is reduced for the route ahead. This can be taken into account when calculating the fuel consumption and the time of arrival in order to update the display, for instance as illustrated in FIG. 1.

Figure 4:
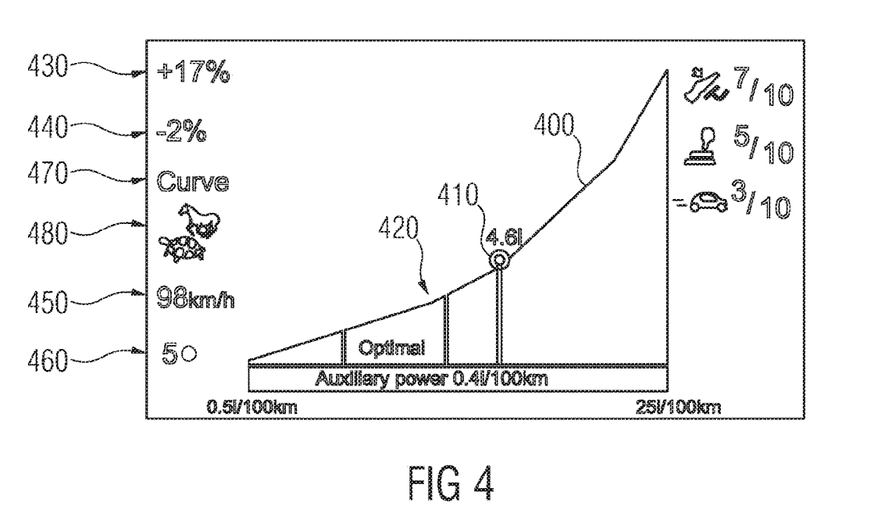
FIG. 4 shows a further possibility for the user output with a further scale and further information, according to the teachings of the present disclosure.

FIG. 4 shows a further example display for a scale 400 having a mark 410. This scale 400 continuously represents the consumption by means of its height and the color gradient, the consumption increasing from left to right. The mark 410 shows the current consumption, here in the form of the statement of 4.6 liters. A strip is also displayed below the scale, the height of which strip represents the consumption of the additional users, which is 0.4 liters per 100 km in FIG. 4. FIG. 4 also illustrates, inside the scale, a desired range 420 within which the mark 410 (relating to the current consumption) is intended to be situated if the user input which has been input is intended to comply only with the consumption trend (or speed or time of arrival trend).

The field 430 is used to numerically display the difference between the current consumption and the desired consumption. The field 440 is used to display the driving time as a percentage, which is 2% below the desired driving time in FIG. 4.

The driving speed 450 and the currently selected gear 460 are also represented on the display, in which case a bend ahead is also indicated as environmental information 470. The currently set time of arrival trend 480 is also displayed, the brightness of the horse icon indicating the difference from the shorter driving time, and the brightness of the tortoise icon indicating the trend to the lower fuel consumption.

What is claimed is:

1. A method for analyzing and displaying fuel consumption data for a vehicle navigation apparatus, the method comprising:
   receiving, via a user input interface, a destination user input indicating a target destination for the vehicle;
   using a global positioning system (GPS) system to determine a current location of the vehicle;
   calculating, by a processor, a distance of a route to the target destination from the determined current location of the vehicle;
   receiving, via the user input interface, a fuel-consumption-related user input comprising at least one of a desired speed, a desired time of arrival, or a desired fuel consumption trend;
   calculating, by the processor, a target fuel consumption metric and a target time of arrival for the target destination based at least on the calculated distance to the target destination and the fuel-consumption-related user input;
   during a journey of the vehicle along the route to the target destination, collecting vehicle sensor data from at least one vehicle sensor;
   calculating, by the processor, an actual fuel consumption metric based on the collected vehicle sensor data; and
   displaying, on a visual display device, a difference between the actual fuel consumption metric calculated based on the vehicle sensor data and the target fuel consumption metric calculated based on the fuel-consumption-related user input.

2. The method as claimed in claim 1, further comprising:
   calculating a driving speed profile for the route to the target destination; and
   transmitting the driving speed profile to a mobile radio terminal, to a stationary computer, or to a central computer.

3. The method as claimed in claim 2, further comprising transmitting the driving speed profile to the mobile radio terminal or to the computer and storing the profile together with driving speed profiles of further drivers of the same vehicle or of a group of drivers.

4. The method as claimed in claim 2, further comprising transmitting the driving speed profile to the central computer and storing the transmitted driving speed profile together with driving speed profiles of further drivers, each of the driving speed profiles relating to the route.

5. The method as claimed in claim 1, further comprising calculating the target fuel consumption metric and the target time of arrival by a mobile radio terminal, by a stationary computer, or by a central computer.

6. The method as claimed in claim 5, further comprising:
   determining environmental information relating to the target destination or to the route; and
   calculating the target fuel consumption metric and the target time of arrival based at least in part on the environmental information.

7. The method as claimed in claim 6, wherein the environmental information includes:
   traffic, road condition, or weather information from a traffic or weather service;
   traffic or road condition information transmitted by vehicles by means of car-to-X communication; or
   geographical properties of the route.

8. The method as claimed in claim 1, further comprising:
   receiving, via the user input interface, an efficiency request user input representing a desired trend to reduce fuel consumption or shorten a driving time in a plurality of stages;
   changing a target fuel consumption value based at least in part on the efficiency request user input; and
   calculating the fuel consumption metric and the target time of arrival based at least in part on the changed consumption value.

9. The method as claimed in claim 8, further comprising displaying, on the visual display device, an efficiency request selection containing a plurality of fuel consumption values or times of arrival.

10. The method as claimed in claim 8, further comprising:
    calculating a plurality of fuel consumption values or times of arrival based at least in part on different speed or consumption trends, and a desired fuel consumption value or time of arrival received via the user input interface; and
    displaying on the visual display device an efficiency request selection containing the calculated plurality of fuel consumption values or times of arrival.

11. The method as claimed in claim 1, further comprising:
    calculating target accelerations or speeds of the vehicle corresponding with the target fuel consumption metric; and
    displaying, on the visual display device, a user output representing a difference between current accelerations or speeds of the vehicle, as determined based on the vehicle sensor data, and accelerations or speeds that correspond with the target fuel consumption metric and the target time of arrival.

12. The method as claimed in claim 11, further comprising updating the target fuel consumption metric.

13. The method as claimed in claim 11, further comprising:
    receiving, via the user input interface, user input specifications including speed, acceleration, or braking specifications
    displaying, on the visual display device, target speed, acceleration, or braking specifications corresponding to the target fuel consumption and the target time of arrival, on respective sections of the route;
    the target specifications being displayed on the visual display device in a comparative manner with the respective user input specifications received via the user input interface.

14. The method as claimed in claim 11, further comprising displaying target speed, acceleration, or braking specifications, corresponding to the calculated target fuel consumption and the calculated target time of arrival, on respective sections of the route;
    wherein the target specifications are displayed on the visual display device in a comparative manner with recorded the respective user input specifications received via the user input interface.

15. The method as claimed in claim 1, further comprising:
    displaying, on the visual display device, a user output representing the calculated target fuel consumption and the calculated target time of arrival and a difference between current accelerations or speeds of the vehicle as calculated based on collected vehicle sensor data and accelerations or speeds corresponding with the calculated target fuel consumption and the calculated target time of arrival based at least in part on environmental information relating to the route to the target destination.

16. The method as claimed in claim 1, further comprising:
displaying, on the visual display device, a user output representing the calculated target fuel consumption and the calculated target time of arrival and a difference between current accelerations or speeds of the vehicle as calculated based on collected vehicle sensor data and accelerations or speeds corresponding with the calculated target fuel consumption and the calculated target time of arrival based at least in part on environmental information relating to the route to the destination;
wherein the user output comprises a scale representing a range of consumption values and a mark inside the scale corresponding to the calculated target fuel consumption.

17. The method as claimed in claim 16, further comprising:
displaying, on the visual display device, a mark inside the scale, the mark representing a minimum achievable consumption based on the target time of arrival, and
displaying, on the visual display device, environmental information including traffic, or road condition, or weather information for the route;
wherein calculating the minimum achievable consumption, includes accounting for the environmental information or vehicle parameters.

* * * * *